Nov. 21, 1961  D. J. McLAUGHLIN ET AL  3,010,059
TWO WAY STEPPING SERVOMOTOR CONTROL CIRCUIT
Filed Sept. 30, 1959
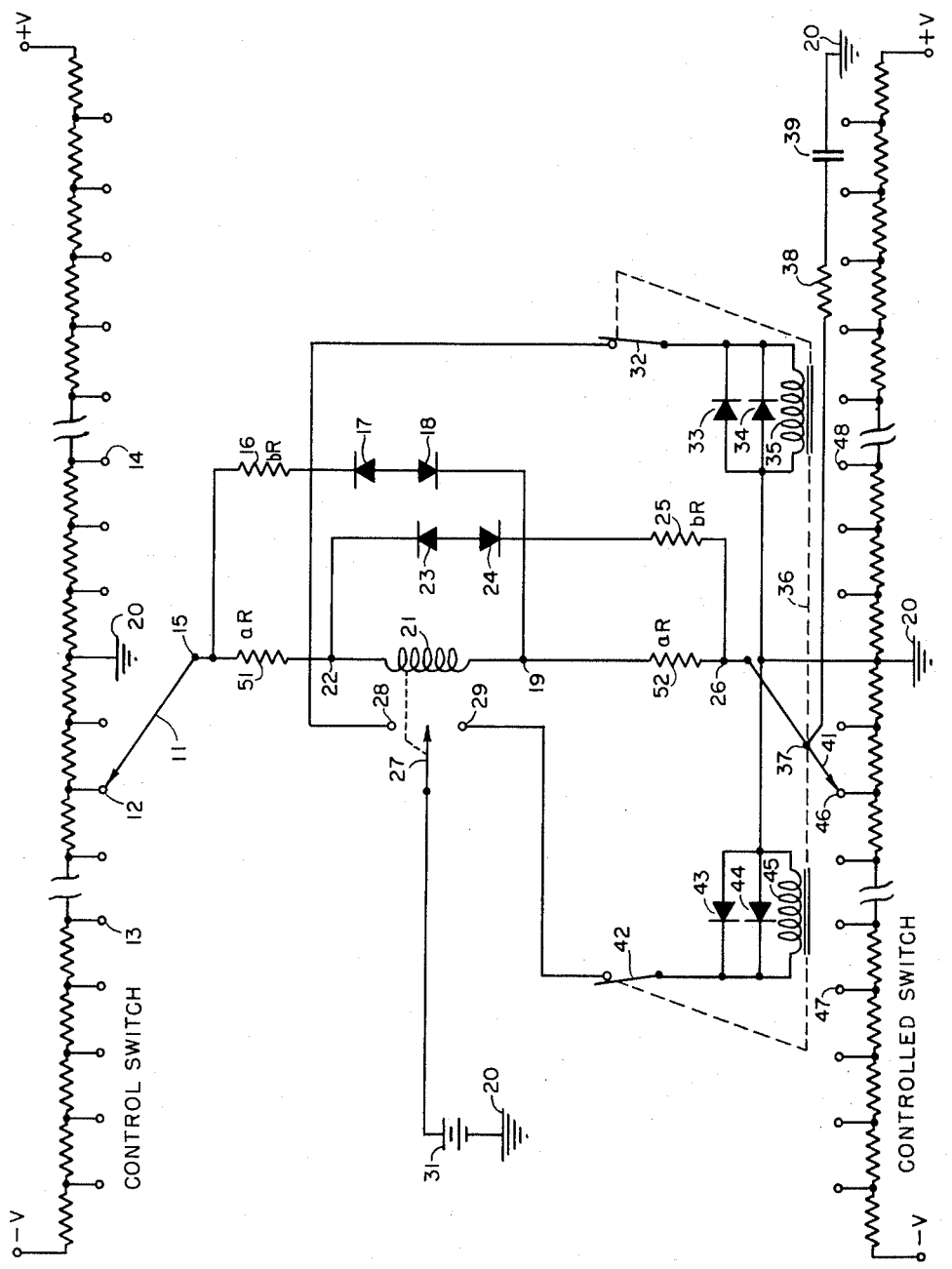
INVENTORS
FREDERICK R. FLUHR
DONALD J. McLAUGHLIN
BY Richard C. Reed
ATTORNEY United States Patent Office 3,010,059
Patented Nov. 21, 1961

3,010,059
TWO WAY STEPPING SERVOMOTOR
CONTROL CIRCUIT
Donald J. McLaughlin, Washington, D.C., and Frederick R. Fluhr, Fort Foote, Md., assignors to the United States of America as represented by the Secretary of the Navy
Filed Sept. 30, 1959, Ser. No. 843,599
4 Claims. (Cl. 318—21)
(Granted under Title 35, U.S. Code (1952), sec. 266)

The invention described herein may be manufactured and used by or for the Government of the United States of America for governmental purposes without the payment of any royalties thereon or therefor.

This invention relates to two way stepping switch controls and, more particularly, to two way stepping switches which are remotely controlled.

There was a need in the art for a simple, remote control of a multi-bank, multi-position switch to rapidly read out relative amounts of information from a computer at a single instance of time without a large number of interconnecting wires. Some of the prior art devices included servo mechanisms which proved to be too complex to provide control. Also, control circuits including gas voltage reference tubes lacked the wide range of voltage limits which were required.

It is, therefore, an object of this invention to provide a remote control for a multi-bank, multi-position switch which has a minimum number of wires interconnecting the control switch and the controlled switch.

An other object is to provide rapid response of a controlled switch to the activity of the controlled switch.

Still another object is to provide a remote control for a stepping switch which gives positive control of the activity of the stepping switch.

A further object of this invention is to provide a remote control circuit which will operate over a wide range of voltage limits.

A still further object is to provide the shortest path for a stepping device in a controlled switch to follow in arriving at the corresponding contact to that one contacted by a control switch.

Other objects and advantages of this invention will hereinafter become more fully apparent from the following description of the annexed drawing, which illustrate a preferred embodiment, and wherein:

The single figure shows a schematic diagram of the circuit of this invention.

Briefly, the circuit of this invention is a multi-position control switch which provides a control signal to a relay which includes a set of contacts which can be closed in one direction when the relay is energized in one direction, which can be closed in the other direction when the relay is energized in the other direction, or open when the relay is not energized. This energization results from the presence of a difference voltage between a potential provided by resistance networks on both the control and the controlled switch wherein corresponding contacts on the two switches are represented by equal potentials. Two Zener diode paths detect such voltage differences and provide the shortest path for one of a pair of relay type stepping devices for the controlled switch to follow to arrive at the corresponding contact to that one contacted on the control switch.

Referring now to the drawing, there is shown a moving contact 11 in contact with contact 12 on the control switch. A resistance network is provided to give an equipotential drop between each of the adjacent contacts, such as 12, 13, and 14, on the control switch. The resistance network can be energized in several ways, a negative potential minus V is shown for one end of the network, connection to a common return 20 is shown at the center of the network and a positive voltage of plus V is shown at the other end. It is obvious that the contacts could be push button types instead of the moving contact type shown.

Moving contact 11 is connected at junction 15 to a series connected circuit path which includes resistor 16 of value $bR$, Zener diodes 17 and 18 connected back-to-back, junction 19, relay coil 21, junction 22, Zener diodes 23 and 24 connected back-to-back, resistor 25 of value $bR$, junction 26 and moving contact 41 of the controlled switch. The controlled switch includes terminals, such as 46, 47, and 48, and a resistance network with potential applied thereto. The control bank of the controlled stepping switch has the same number of contacts as the control switch and employs an identical resistance network. Connected between junctions 15 and 22 is a resistor 51 of value $aR$ and connected between junctions 19 and 26 is a resistor 52 of value $aR$. The relay coil 21 operates a three position moving contact 27 to be in contact with a terminal 28, a terminal 29, or no terminal at all. A direct current power source 31 is connected between moving contact 27 and the common return 20. Terminal 28 is connected through interrupting switch 32 to stepping relay coil 35 with unidirectional devices 33 and 34 connected thereacross in parallel. The unidirectional devices 33 and 34 are polarized so as to suppress the arc across switch 32 due to the interruption of current in coil 35. Terminal 29 is connected to a stepping relay circuit which is identical with the one connected to terminal 28 with its interrupting switch 42, relay coil 45 and unidirectional elements 43 and 44. The unidirectional device pairs 33, 34; 43, 44; comprise spark suppressing circuitry, each pair of which could be replaced by a single unidirectional device of proper value. The two stepping relay circuits provide the two way movement of the moving contact 41 and are connected to the common return 20. Also connected to moving contact 41 at a junction 37 is a circuit which includes a resistor 38 in series with a capacitor 39 connected to the common return 20. This noise suppression circuit can be eliminated when the radiation of switching noise is not a problem.

It is seen that two identical resistor divider networks are provided. One network is wired to one bank on the stepping switch and is called the stepping switch control bank. The other resistor divider chain is wired to a set of push buttons, for example, or may be wired to a rotary control switch, as shown. It is a requirement of this circuit that only one contact on the control switch or only one push button be engaged at any one time. The two way stepping switches in the art may or may not be re-entrant types. This device is to be applied to a re-entrant type two way stepping switch so that when a particular control switch position is selected, the stepping switch will home to the corresponding position in the shortest distance and, consequently, in the shortest time. The rotary switch, as shown, will cause the stepping switch to follow the rotation of the rotary switch when it is operated.

The control circuit, which is called a comparator, consists of a sensitive null sensing relay, such as a Barber-Colman Micro-Positioner, with three operating positions. The moving contact 27 can be nulled, i.e., not in contact with either contact 28 or 29, or the moving contact 27 can be in contact with either of the two contacts 28 or 29. The relay remains in the null position when there is no current through the coil 21. When the current is in one direction, the moving contact swings over to one contractor position. When the current through the coil 21 is in the opposite direction, the moving contact 27 makes contact with the other contactor. Four silicon junction diodes 17, 18, 23 and 24, with Zener voltages approximately equal to V are required in the comparator as a sensing circuit for determining which stepping motor will operate when the shortest path between the present contact and the newly reset contact point is through the re-entrant portion of the controlled switch. When the control switch is reset to another net contact, the voltage at junction 15 is changed, thus causing a voltage drop across junction 15 and junction 26. If the voltage is more negative at junction 15 than at junction 26 and the voltage drop thereacross is less than V, the current will flow from 26 to 15 through the relay 21 causing it to operate and cause the proper stepping switch motor 35 or 45 to step the stepping switch in the shortest direction until the null point of moving contact 27 has been reached. If the voltage at 26 is more negative than the voltage at 15 and the voltage drop across 15—26 is less than V, then the stepping switch will operate in the opposite direction and still the shortest distance to the null point.

In the case of the re-entrant stepping bi-directional stepping switch, fewer steps are required to go through the re-entrant part of the switch than to reverse and go backwards to a position more near the opposite side of the switch. For this purpose, the Zener diode-resistor network is used to cause the stepping switch to pass through the re-entrant position when this condition is caused. If a contact on the control switch is closed by the moving contact 11, which causes the voltage across junctions 15 and 26 to be greater than V, then one Zener diode of each pair breaks down. The other diode in each pair conducts in the forward direction. The resistors 16 and 25 of value $bR$ are smaller than resistors 51 and 52 of value $aR$, thus the opposite sides of the coil are caused to be reversed in polarity and thus causing the current to flow in the opposite direction in the relay coil 21. This causes the relay to operate the proper stepping switch motor to cause the stepping switch to home through the re-entrant portion of the switch. These electrical connections are set up so that the stepping switch will always traverse the shortest distance to the null. Zener diodes are used back-to-back so that the voltages developed across each pair can be bi-directional.

So it is seen that we have provided a very efficient remote control for a multi-bank, multi-position switch which has only two wires interconnecting the control switch and the controlled switch. The controlled switch is rapidly set by the control switch, and the control circuits will operate over a wide range of voltage levels.

The embodiment of this disclosure is revealed as including a control device and a follower device which are both re-entrant, that is, both can be moved through a zero point without the necessity of backing up to arrive at a point that is past the zero point. Another embodiment would be where the control device is not re-entrant and, therefore, the follower device need not be re-entrant. A third embodiment would include a re-entrant type control device and a unidirectional follower. These latter two embodiments would be operative by the circuit of this invention by the elimination of the Zener diode circuits, tying terminals 28 and 29 together and substituting a conventional single contact relay for the multiposition relay shown. For the third embodiment, only the stepping motor which provides the unidirectional motion of the follower is included.

Since many variations of the specific embodiment described above will occur to those skilled in the art, the invention is to be limited only as specified in the following claims.

What is claimed is:

1. In a two way stepping switch control circuit, a control switch, a controlled switch, each of said switches including a movable contact, means for determining the relative positions of said movable contacts, sensing means responsive to any differential in the relative position of said movable contacts for enabling re-entry of said movable contact for said controlled switch, stepping means controlled by said sensing means to remove the differential in the relative position of said movable contacts by the shortest path.

2. In a two way stepping switch control circuit, a control switch, a controlled switch, each of said switches including like divider networks with contact means for each divided level, a direct current source, corresponding ends of each of said divider networks connected across said direct current source so that corresponding contacts on the two switches are energized at the same potential, a movable contact on the control switch connected to a moved contact on the controlled switch, comparator means for determining potential differential connected to said movable contact and said moved contact, a first stepping motor on said controlled switch for moving the moved contact in one direction, a second stepping motor on said controlled switch for moving the moved contact in the other direction, sensing means connected to said comparator means and to said stepping motors to select which of said motors is to be operated when the shortest path to be tranversed is through the re-entry portion of the switch, and a power source connected to said sensing means for operating said selected motor.

3. In a stepping switch control circuit, a re-entrant control switch, a re-entrant controlled switch, each of said switches including like divider networks with contact means for each divided level, a direct current source, corresponding ends of each of said divider networks connected across said direct current source so that corresponding contacts on the two switches are energized at the same potential, a movable contact on the control switch connected to a moved contact on the controlled switch comparator means for determining the potential difference connected to said movable contact and said moved contact including sensing means for enabling re-entry of said moved contact, and a stepping motor on said controlled switch for moving the moved contact.

4. In a stepping switch control circuit, a non re-entrant control switch, a controlled switch, each of said switches including like divider networks with contact means for each divided level, a direct current source, corresponding ends of each of said divider networks connected across said direct current source so that corresponding contacts on the two switches are energized at the same potential, a movable contact on the control switch connected to a moved contact on the controlled switch, comparator means for determining the potential difference connected to said movable contact and said moved contact, a first stepping motor on said controlled switch for moving the moved contact in one direction, a second stepping motor on said controlled switch for moving the moved contact in the other direction, sensing means connected to said comparator means and to said stepping motors to select which of said motors is to be operated so that the stepping motors will home to the newly selected position in the shortest distance, and a power source connected to said sensing means for operating said selected motor.

References Cited in the file of this patent

UNITED STATES PATENTS

| | | |
|---|---|---|
| 2,085,442 | Newell | June 29, 1937 |
| 2,318,541 | Tewksbury | May 4, 1943 |
| 2,471,075 | Montrose-Oster | May 24, 1949 |